United States Patent
Yin et al.

(10) Patent No.: US 9,049,677 B2
(45) Date of Patent: Jun. 2, 2015

(54) METHOD, APPARATUS AND SYSTEM FOR PAGING PROCESSING AND INFORMATION DISPLAYING

(75) Inventors: Yu Yin, Shanghai (CN); Yijun Yu, Shanghai (CH)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/101,816

(22) Filed: May 5, 2011

(65) Prior Publication Data

US 2011/0207481 A1    Aug. 25, 2011

Related U.S. Application Data

(63) Continuation of application No. PCT/CN2009/074812, filed on Nov. 5, 2009.

(30) Foreign Application Priority Data

Nov. 7, 2008  (CN) .......................... 2008 1 0225981

(51) Int. Cl.
*H04W 68/00* (2009.01)
*H04W 76/02* (2009.01)
*H04W 36/00* (2009.01)

(52) U.S. Cl.
CPC ............ *H04W 68/00* (2013.01); *H04W 68/005* (2013.01); *H04W 76/02* (2013.01); *H04W 36/0022* (2013.01)

(58) Field of Classification Search
CPC ........................ H04W 68/00; H04W 36/0022
USPC .............. 455/458, 434, 435.2, 436, 438, 439, 455/445, 509, 515; 370/328, 331, 352, 401
See application file for complete search history.

(56) References Cited

U.S. PATENT DOCUMENTS

| 6,594,490 B1 | 7/2003 | Ushiki et al. |
| 2007/0197209 A1 | 8/2007 | Hashimoto |

(Continued)

FOREIGN PATENT DOCUMENTS

| CN | 1602104 A | 3/2005 |
| CN | 1633100 A | 6/2005 |

(Continued)

OTHER PUBLICATIONS

Office Action issued in corresponding Chinese Patent Application No. 200810225981.4, mailed Dec. 3, 2010.
Written Opinion of the International Searching Authority issued in corresponding PCT Patent Application No. PCT/CN2009/074812, mailed Feb. 11, 2010.
International Search Report issued in corresponding PCT Patent Application No. PCT/CN2009/074812, mailed Feb. 11, 2010.

(Continued)

*Primary Examiner* — Olumide T Ajibade Akonai
*Assistant Examiner* — Natasha Cosme
(74) *Attorney, Agent, or Firm* — Slater & Matsil, L.L.P.

(57) ABSTRACT

A method, an apparatus, and a system for paging processing and information displaying are disclosed. The paging processing method includes: receiving a paging request message from a Mobile Switching Center (MSC) which a called User Equipment (UE) registers to; and when the called UE is connected, sending a paging notification message to the called UE, and returning a called-UE paging status message to the MSC. In the embodiments of the present invention, after the Mobility Management Entity (MME) receives the paging request message from the MSC, if the called UE is connected, the MME not only sends a Circuit-Switched (CS) paging notification message to the called UE, but also returns a paging status message to the MSC, indicating that the called UE has received the paging notification message.

10 Claims, 6 Drawing Sheets

(56) References Cited

U.S. PATENT DOCUMENTS

| | | |
|---|---|---|
| 2007/0286176 A1 | 12/2007 | Flint |
| 2008/0108338 A1* | 5/2008 | Herrero Veron et al. .. 455/414.3 |
| 2009/0170426 A1* | 7/2009 | Jung et al. ................. 455/7 |
| 2010/0061305 A1* | 3/2010 | Kubo ......................... 370/328 |
| 2010/0265884 A1* | 10/2010 | Vikberg et al. ............. 370/328 |

FOREIGN PATENT DOCUMENTS

| | | |
|---|---|---|
| CN | 1728743 A | 2/2006 |
| CN | 1859802 A | 11/2006 |
| CN | 1878337 A | 12/2006 |
| CN | 1941997 A | 4/2007 |
| CN | 101002490 A | 7/2007 |
| CN | 101009927 A | 8/2007 |
| CN | 101022653 A | 8/2007 |
| CN | 101184272 A | 5/2008 |
| CN | 101222765 A | 7/2008 |
| CN | 101243711 A | 8/2008 |
| CN | 101394340 A | 3/2009 |
| CN | 101394580 A | 3/2009 |
| CN | 101437219 A | 5/2009 |
| CN | 101466147 A | 6/2009 |
| CN | 101577892 A | 11/2009 |
| CN | 101577942 A | 11/2009 |
| CN | 101640933 A | 2/2010 |
| EP | 1619914 A1 | 1/2006 |
| JP | 2000244964 | 9/2000 |
| WO | 2006043318 A1 | 4/2006 |
| WO | 2008088252 A1 | 7/2008 |
| WO | WO 2009067880 A1 | 6/2009 |

OTHER PUBLICATIONS

Office Action issued in corresponding Chinese Patent Application No. 200810225981.4, mailed Sep. 5, 2011.

Corresponding granted Chinese Patent No. 101742692 (Application No. 200810225981.4) citing prior art at Item (56), issued Jul. 4, 2012, 1 page. only.

3GPP TS 23.272 V8.1 .0: "3rd Generation Partnership Project; Technical Specification Group Services and System Aspects; Circuit Switched Fallback in Evolved Packet System; Stage 2(Release 8)," dated Sep. 2008, 46 pages total.

3GPP TS 23.060 V8.2.0: "3rd Generation Partnership Project; Technical Specification Group Services and System Aspects; General Packet Radio Service (GPRS); Service description; Stage 2(Release 8)," dated Sep. 2008, 268 pages total.

European Search report issued in corresponding European patent application No. 09824418.9 ,dated Jul. 27,2012, 13 pages total.

Huawei,"Discussion on the CLI for CS fallback," 3GPP TSG CT WG4 Meeting #40-bis, C4-082700, Phoenix, US, Oct. 6-10, 2008, total 3 pages.

Office action issued in corresponding Japanese application No. 2011-534994, Sep. 25, 2012, and an English translation thereof, total 8 pages.

3rd Generation Partnership Project; Technical Specification Group Services and System Aspects; General Packet Radio Service (GPRS) enhancements for Evolved Universal Terrestrial Radio Access Network (E-UTRAN) access (Release 8), 3GPP TS 23.401 V8.3.0, Sep. 2008, 204 pages.

Huawei, "CS Fallback solution with SRVCC Alt-E," 3GPP TSG SA WG2 Meeting #62, TD S2-080187, Jan. 14-18, 2008, 7 page.

* cited by examiner

METHOD, APPARATUS AND SYSTEM FOR PAGING PROCESSING AND INFORMATION DISPLAYING

CROSS-REFERENCE TO RELATED APPLICATIONS

This application is a continuation of International Application No. PCT/CN2009/074812, filed on Nov. 5, 2009, which claims priority to Chinese Patent Application No. 200810225981.4, filed on Nov. 7, 2008, both of which are hereby incorporated by reference in their entireties.

FIELD OF THE INVENTION

The present invention relates to communication technologies, and in particular, to a method, an apparatus, and a system for paging processing and information displaying.

BACKGROUND OF THE INVENTION

An Evolved Universal Mobile Telecommunication System Territorial Radio Access Network (E-UTRAN) and an Evolved Packet Core (EPC) make up an Evolved Packet System (EPS), where the Universal Mobile Telecommunication System is abbreviated to UMTS. Some operators expect to provide voice services still through the traditional 2G/3G radio access network and Circuit-Switched (CS) core network after deploying the EPS network. The EPS network provides only Packet-Switched (PS) data service access. In the foreseeable future, the EPS network will coexist with the traditional 2G/3G CS network. Most User Equipments (UEs) keep a radio connection of one radio access technology at one moment to reduce costs and battery consumption and save air interface signaling. Therefore, a CS fallback solution is put forward. A UE can access the CS core network through a 2G/3G access network such as the Global System for Mobile Communications (GSM)/GSM Enhanced Data rate for GSM Evolution Radio Access Network (GERAN) (Enhanced Data rate for GSM Evolution is abbreviated to EDGE), UTRAN, and Code Division Multiple Access (CDMA) Access Network (AN), or access the EPC through an E-UTRAN. After the UE is attached to the EPS, an association is set up between a Mobility Management Entity (MME) which the UE registers to and a Mobile Switching Center (MSC) in the CS domain which the UE registers to. The interface between the MME and the MSC is defined as an SGs interface in the EPS standard. After the SGs interface association is set up, the UE may access the EPC on the E-UTRAN to use packet services when no CS voice service is in progress. If a voice service needs to be performed, the UE may fall back to the GERAN/UTRAN/CDMA AN through a CS fallback procedure to set up a CS call link according to the existing CS procedure and perform the voice service, which is known as CS fallback. When the UE performs the voice service, the packet bearer of the UE is generally suspended by the network. After the packet bearer is suspended, the network still reserves the IP address of the packet bearer allocated to the UE, but the packet bearer is unable to transmit packet data at this time, namely, the data service is interrupted. After the voice service of the UE is completed, the network may resume the packet bearer of the UE through a resume procedure, and the UE resumes the packet service.

It is assumed that the UE accesses the CS core network through a UTRAN. After the MME is associated with the MSC at the SGs interface (the setup of the SGs interface association means that the UE accesses the EPC through an E-UTRAN currently and registers with the MSC through the EPC), if the MSC receives a UE Initial Address Message (IAM) from the calling party, the MSC forwards a paging request message to the MME. After the MME receives the paging request message, if the UE is currently connected, the MME sends a paging notification message to the UE directly through a signaling connection between the MME and the UE. After receiving the paging notification message, the UE may display prompt information according to the CS fallback configuration and the current service status on the UE. The prompt information indicates to the user that a voice call arrives and asks the user whether to interrupt the current data service and fall back to the CS domain to answer the voice call. If the UE receives a command input by the user intending to interrupt the current data service and answer the voice call, the UE may notify the MME to perform a CS fallback procedure, fall back to the CS domain and set up a CS call link for the voice service, and hand over the current packet bearer to the UTRAN and suspend it. If the UE receives a command input by the user intending to reject the voice call, the UE may send a service request message carrying the cause of rejection to the MME. After receiving the message, the MME notifies the MSC that the called user rejects the voice call through an SGs interface. The MSC responds to the calling party according to a paging failure procedure or a UE rejection procedure. In this case, the ongoing UE data service on the E-UTRAN is not affected.

In the process of implementing the present invention, the inventor finds at least these problems in the prior art: After the UE displays the prompt information, the user of the UE needs to confirm whether to "interrupt the current data service and answer the voice call" or "continue the current data service and reject the voice call". The confirmation is a man-machine interaction process. It takes a few seconds or more for the user of the UE to see the prompt information, make a judgment, and send confirmation information to the UE. After the MSC sends a paging request message to the MME, the MSC keeps waiting for a paging response from the UE. Generally, the waiting time of the MSC is over 10 seconds. In the CS fallback solution, if the MSC fails to receive the paging response from the UE in a long period because of waiting for the confirmation of the CS fallback operation from the user, the MSC is unable to know whether the UE failed to be paged on the E-UTRAN side, or whether the UE is still waiting for the confirmation from the user after successfully receives the paging request on the E-UTRAN side. Consequently, the MSC mistakenly believes that the paging fails, and terminates the call procedure or attempts the paging on the 2G/3G access network instead mistakenly. In the existing CS domain, after the called user is paged successfully and a CS call link is set up, an alerting message is returned to the calling party, and the calling party hears the ring back tone, which takes only a few seconds normally. In the CS fallback solution, however, while waiting for the called user to confirm the CS fallback operation, the calling party may terminate the call actively because the calling party hears no ring back tone in a long period, and mistakenly believes that the network fails. Thus the voice service is affected.

SUMMARY OF THE INVENTION

Embodiments of the present invention provide a method, an apparatus and a system for paging processing and information displaying to improve the success ratio of paging initiated by an MSC which a UE registers to the UE currently connected on an E-UTRAN.

A paging processing method provided in an embodiment of the present invention includes:

receiving a paging request message sent by an MSC server which a called UE registers to; and sending a paging notification message to the called UE when the called UE is connected, and returning a called-UE paging status message to the MSC server.

An information displaying method provided in an embodiment of the present invention includes:

receiving a paging notification message that carries a service type identifier (ID); displaying first prompt information that instructs a user to confirm whether to accept a CS fallback procedure;

obtaining a first instruction, where the first instruction is input by the user according to the first prompt information;

triggering execution of the CS fallback procedure according to the first instruction;

displaying second prompt information according to the service type ID and the first instruction, where the second prompt information instructs the user to confirm whether to put through a call;

obtaining a second instruction, where the second instruction is input by the user according to the second prompt information; and returning a Connect message to the MSC server to put through the call according to the second instruction, or executing an operation procedure corresponding to the service type ID.

A mobility management apparatus provided in an embodiment of the present invention includes:

a first receiving module, configured to receive a paging request message sent by an MSC server which a called UE registers to; and a notifying module, configured to send a paging notification message to the called UE when the called UE is connected and after the first receiving module receives the paging request message, and return a called-UE paging status message to the MSC server.

An MSC server provided in an embodiment of the present invention includes:

a second receiving module, configured to receive a called-UE paging status message returned by a mobility management apparatus; and a processing module, configured to extend time of waiting for a called UE to return a paging response message after the second receiving module receives the paging status message.

A UE provided in an embodiment of the present invention includes:

a third receiving module, configured to receive a paging notification message that carries a service type ID;

a first displaying module, configured to display first prompt information after the third receiving module receives the paging notification message, where the first prompt information instructs a user to confirm whether to accept a CS fallback procedure;

a first obtaining module, configured to obtain a first instruction, where the first instruction is input by the user according to the first prompt information;

a first executing module, configured to trigger execution of the CS fallback procedure according to the first instruction;

a second displaying module, configured to display second prompt information according to the service type ID and the first instruction, where the second prompt information instructs the user to confirm whether to put through a call;

a second obtaining module, configured to obtain a second instruction, where the second instruction is input by the user according to the second prompt information; and a second executing module, configured to return a Connect message to the MSC server to put through the call according to the second instruction, or execute an operation procedure corresponding to the service type ID.

A paging processing system provided in an embodiment of the present invention includes:

an MSC server, configured to send a paging request message to a mobility management apparatus, receive a called-UE paging status message returned by the mobility management apparatus, and extend time of waiting for a called UE to return a paging response message; and the mobility management apparatus, configured to receive the paging request message sent by the MSC server, send a paging notification message to the called UE when the called UE is connected, and return the called-UE paging status message to the MSC server.

In the technical solution under the present invention, after the MME which the UE registers to receives a paging request message from the MSC which the called UE registers to, if the called UE is connected, the MME sends a CS paging notification message to the called UE; or returns a paging status message to the MSC, indicating that the called UE has received the paging notification message. In this way, the embodiments of the present invention improve the success ratio of paging initiated by the MSC which the UE registers to the UE currently connected on the E-UTRAN.

BRIEF DESCRIPTION OF THE DRAWINGS

To make the technical solution under the present invention clearer, the accompanying drawings for illustrating the embodiments of the present invention or the prior art are described below. Apparently, the accompanying drawings are exemplary only, and persons having ordinary skill in the art can derive other drawings from such accompanying drawings without any creative effort.

DETAILED DESCRIPTION OF THE EMBODIMENTS

The technical solution under the present invention is described below with reference to embodiments and accompanying drawings. Evidently, the embodiments described below are exemplary only, without covering all embodiments of the present invention. All other embodiments, which can be derived by those skilled in the art from the embodiments provided herein without any creative efforts, shall fall within the scope of the present invention.

In the CS fallback solution, the overall architecture of the CS fallback solution and the idea of the present invention are applicable regardless of the type of target CS system. For ease of description, it is assumed that CS fallback occurs before the UE accesses the EPC through an E-UTRAN and after the UE accesses the CS core network through a UTRAN.

Figure 1:
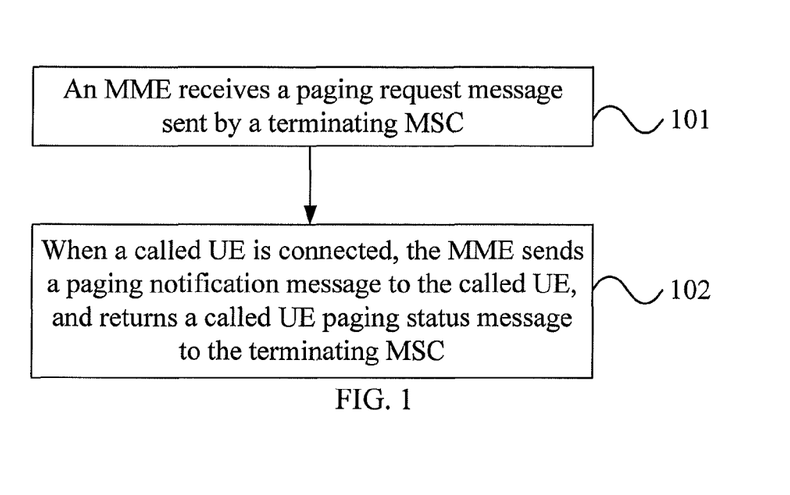
FIG. 1 is a flowchart of a paging processing method provided in a first embodiment of the present invention.

FIG. 1 is a flowchart of a paging processing method provided in the first embodiment of the present invention. In this embodiment, a called UE accesses an EPC currently through an E-UTRAN, and an MME which the called UE registers to (hereinafter referred to as a called MME) is associated with an MSC which the called UE registers to (hereinafter referred to as a terminating MSC) through an SGs interface. As shown in FIG. 1, the method in this embodiment includes the following steps:

Step 101: The MME receives a paging request message sent by the terminating MSC.

Step 102: When the called UE is connected, the MME sends a paging notification message to the called UE, and returns a called-UE paging status message to the terminating MSC.

In this embodiment, after the MME receives the paging request message from the terminating MSC, if the MME finds that the called UE is connected, the MME not only sends a CS paging notification message to the called UE, but also returns a paging status message to the MSC, indicating that the called UE has received the paging notification message. In this way, the following case can be prevented and therefore the call success ratio is improved: The MSC performs an incorrect operation as a result of mistakenly believing that paging the called UE on the E-UTRAN fails when the called UE waits for the user to confirm execution of the CS fallback procedure.

Figure 2:
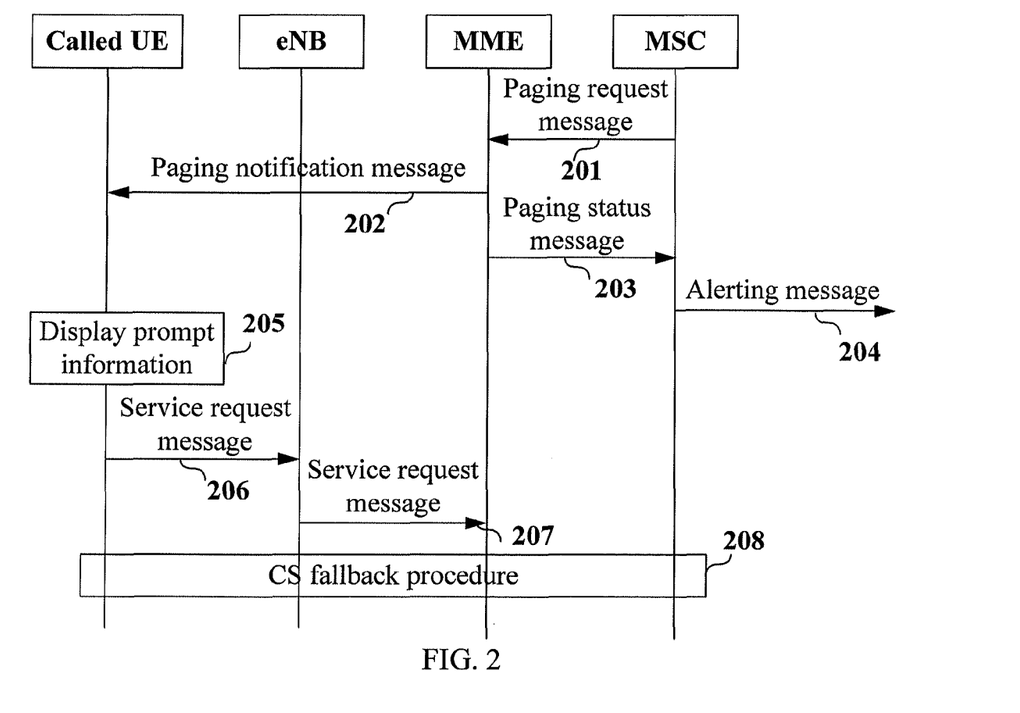
FIG. 2 is a flowchart of a paging processing method provided in a second embodiment of the present invention.

FIG. 2 is a flowchart of a paging processing method provided in the second embodiment of the present invention. In this embodiment, the called UE accesses the EPC currently through an E-UTRAN, and the called MME is associated with the terminating MSC through an SGs interface. As shown in FIG. 2, the method in this embodiment includes the following steps:

Step 201: The terminating MSC receives an IAM sent by the calling party, where the IAM carries a Mobile Station ISDN (MSISDN) of the called UE. The MSC searches the context of the called UE according to the called UE MSISDN carried in the IAM, and obtains an International Mobile Subscriber Identity (IMSI) corresponding to the called UE. The MSC sends a paging request message to the called MME through the SGs interface, where the paging request message carries the IMSI of the called UE.

The IAM may further carry an ID of the calling UE, for example, the MSISDN of the calling UE. In this case, the paging request message carries the ID of the calling UE accordingly.

Step 202: The MME receives the paging request message, searches the context of the called UE according to the called UE IMSI carried in the paging request message, and sends a CS paging notification message to the called UE through a Non Access Stratum (NAS) message when the MME determines that the called UE is connected according to the status recorded in the context of the called UE.

If the paging request message sent by the MSC in step 201 carries the ID of the calling UE, namely, the MME obtains the ID of the calling UE from the MSC, for example, the MSISDN of the calling UE, the MME in this step may add the MSISDN of the calling UE to the CS paging notification message.

Step 203: The MME returns a called-UE paging status message to the MSC, indicating that the called UE has received the paging notification message and has started a man-machine interaction program.

Step 204: The MSC receives a paging status message, extends time of waiting for the CS paging response from the called UE, and returns an alerting message (namely, the Address Complete Message, which is ACM for short) of CS call link setup to the MSC which the calling UE registers to (hereinafter referred to as the calling MSC) according to the preset policy so that the calling MSC forwards the alerting message to the calling UE.

Step 205: The called UE receives a CS paging notification message, and displays prompt information according to preset CS fallback configuration information, requesting the user to confirm whether to execute a CS fallback procedure.

If the CS paging notification message sent by the MME in step 202 carries the ID of the calling UE, namely, the called UE obtains the ID of the calling UE from the MME, for example, the MSISDN of the calling UE, the called UE in this step may add the MSISDN of the calling UE to the prompt information.

Step 206: After receiving an execution command input by the user, namely, a command for terminating the current data service and performing the voice service, the called UE records a user selection, and sends a service request message to an evolved Node B (eNB).

Step 207: The eNB receives the service request message and forwards it to the MME.

Step 208: The MME receives the service request message, and initiates a CS fallback procedure.

Till this step, the called UE falls back to the CS domain, sets up a CS call link for answering the call, and hands over the current PS bearer to the UTRAN and suspends it.

In step 201 in this embodiment, the ID may be another type of ID that uniquely identifies the called UE, for example, the Temporary Mobile Station Identity (TMSI) of the UE in the CS domain, or MME Temporary Mobile Station Identity (M-TMSI) of the UE in the EPS network, which shall not be construed as limitations to the present invention.

In this embodiment, the MSC keeps waiting for the called UE to return a response before step 204; the MSC may use two types of message as a legal response to the paging request message sent to the MME:

(a) The user of the called UE chooses to "accept" the CS fallback: The called UE sends a service request in the CS domain, and the MSC uses the service request message received in the CS domain as a paging response.

(b) The user of the called UE chooses to "reject" the CS fallback, or makes no confirmation, namely, neither chooses to "accept" the CS fallback nor chooses to "reject" the CS fallback, within a set time (such as 20 seconds): The called UE sends a service request message carrying the cause of rejection to the MME. Through an SGs interface, the MME notifies the MSC that the user of the called UE rejects the call. The MSC returns a response to the calling party, indicating paging failure or user rejection.

Unless otherwise specified herein, the response made by the called UE to the CS paging means that the user of the called UE chooses to "accept" the CS fallback normally, and that the called UE falls back to the 2G/3G access network, and sends a service request message in the CS domain as a CS paging response to the MSC.

In step 204 in this embodiment, after the MSC receives the paging status message, the MSC may return an alerting message to the calling party according to a preset policy. The preset policy may be: The MSC sends the alerting message to the calling MSC immediately. Or the preset policy is: The MSC forwards the alerting message to the calling MSC after a preset period, for example, the MSC starts a paging waiting timer that sets a time limit of 12 seconds. If the MSC still receives no CS paging response from the called UE upon expiry of the paging waiting timer, the MSC sends an alerting message to the calling party, and goes on waiting for the CS paging response from the called UE. If the MSC receives a CS paging response from the called UE before expiry of the paging waiting timer, the MSC may stop the paging waiting timer, and set up a CS call link to the called UE, and return an alerting message to the calling party.

Step 203 in this embodiment may be performed immediately after step 202; or, after completion of step 202, a timer is started, and step 203 is performed after expiry of this timer. For example, a 10 s waiting timer is started, and the time limit of this timer should be less than that of the paging waiting timer of the MSC, and should be less than the time generally spent for the calling MSC and the user of the calling UE in waiting for the alerting message. The MME sends a paging status message to the MSC only if the MME still receives no response of accepting or rejecting the CS fallback procedure from the called UE upon expiry of the waiting timer on the MME. After receiving the paging status message, the MSC knows that the called UE has actually received the CS paging notification message although the CS paging response has not been received from the called UE for a long time, and knows that the called UE is waiting for confirmation from the user or is initiating a CS fallback procedure. The MSC extends the time of waiting for the CS paging response from the called UE, and returns an alerting message of CS call link setup to the calling party according to a preset policy.

Alternatively, step 203 in this embodiment may be performed while the MME sends a CS paging notification message to the called UE in step 202.

Generally, the time limit set by the paging waiting timer on the MSC (including the retransmission time) depends on the time limit for the MSC to wait for the paging response from the UE, and the number of paging retransmissions on the MSC. For example, if the time limit for the MSC to wait for the paging response from the UE is 5 seconds, and the number of paging retransmissions on the MSC is 3, the time limit of the paging waiting timer is 15 seconds. If the MSC still receives no paging response from the called UE upon expiry of the timer, the MSC in the prior art terminates the call because it believes a failure to page the UE on the E-UTRAN, and returns an error message to the calling party. Alternatively, the MSC believes that the called UE is out of the coverage area of the E-UTRAN, and pages the called UE on the UTRAN again. However, the called UE is actually located in the coverage area of the E-UTRAN at this time. Paging the called UE on the UTRAN again increases the radio load on the UTRAN, and leads to a failure to page the called UE. Meanwhile, because the user of the calling UE hears no ring back tone in a long time, the user may believe that the network fails and terminate the call actively.

The MSC in this embodiment obtains the called-UE paging status message returned by the MME before receiving the paging response from the called UE, and knows beforehand that the CS paging request message has been successfully delivered to the called UE that is connected, but the user of the called UE has not confirmed whether to execute the CS fallback procedure or the CS paging response or service request message carrying the cause of rejection has not arrived at the MSC though whether to execute the CS fallback procedure has been confirmed. Therefore, the MSC goes on waiting for a paging response from the called UE, without terminating the call or attempting the paging on the 2G/3G access network instead. Moreover, the MSC can send an alerting message to the calling party at proper time beforehand when the UE is unable to respond to the CS paging request in time, which prevents the calling party from terminating the call actively and improves the call success ratio.

In this embodiment, after the MME receives the paging request message from the MSC, if the MME finds that the called UE is connected, the MME not only sends a CS paging notification message to the called UE, but also returns a paging status message to the MSC, indicating that the called UE has received the paging notification message. In this way, the following case can be prevented and therefore the call success ratio is improved: The MSC performs an incorrect operation as a result of mistakenly believing that paging the called UE on the E-UTRAN fails when the called UE waits for the user to confirm execution of the CS fallback procedure. In addition, the MSC may return an alerting message to the calling party according to a preset policy. In this way, while the called UE waits for the user to confirm execution of the CS fallback procedure, the user of the calling UE never terminates the call as a result of mistakenly believing no response from the called user.

Figure 3:
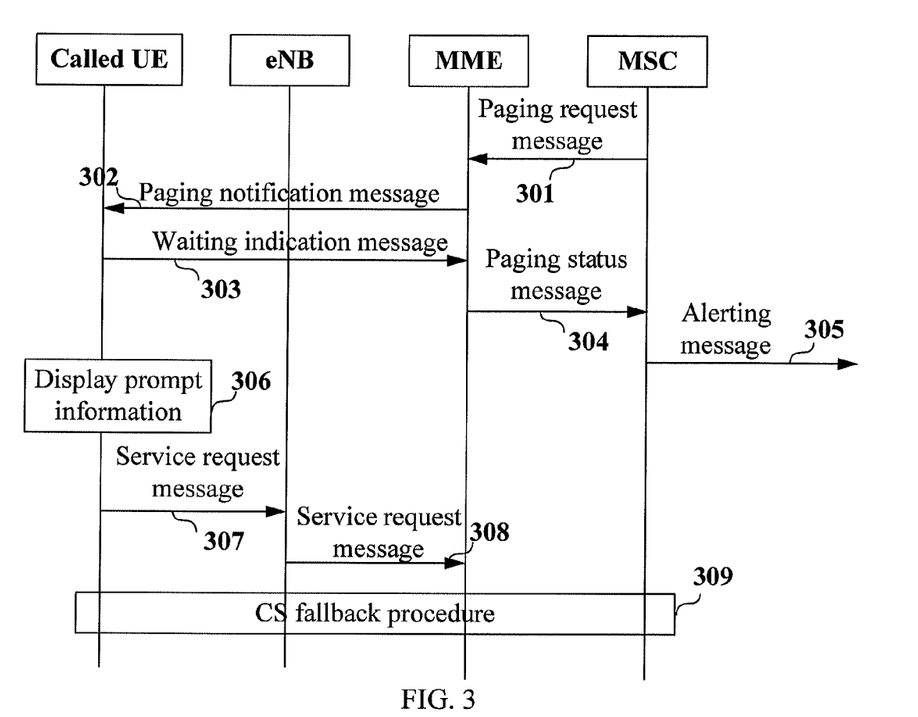
FIG. 3 is a flowchart of a paging processing method provided in a third embodiment of the present invention.

FIG. 3 is a flowchart of a paging processing method provided in the third embodiment of the present invention. In this embodiment, the called UE accesses the EPC currently through an E-UTRAN, and the called MME is associated with the terminating MSC through an SGs interface. As shown in FIG. 3, the method in this embodiment includes the following steps:

Step 301: The terminating MSC receives an IAM from the calling party, where the IAM carries an MSISDN of the called UE. The MSC searches the context of the called UE according to the called UE MSISDN carried in the IAM, and obtains an IMSI corresponding to the called UE. The MSC sends a paging request message to the called MME, where the paging request message carries the IMSI of the called UE.

The IAM may further carry an ID of the calling UE, for example, the MSISDN of the calling UE. In this case, the paging request message carries the ID of the calling UE accordingly.

Step 302: The MME receives the paging request message, searches the context of the called UE according to the called UE IMSI carried in the paging request message, and sends a CS paging notification message to the called UE through a NAS message when the MME determines that the called UE is connected according to the status recorded in the context of the called UE.

If the paging request message sent by the MSC in step 301 carries the ID of the calling UE, namely, the MME obtains the ID of the calling UE from the MSC, for example, the MSISDN of the calling UE, the MME in this step may add the MSISDN of the calling UE to the CS paging notification message.

Step 303: The called UE receives a CS paging notification message, and decides to display prompt information according to preset CS fallback configuration information, requesting the user to confirm whether to execute a CS fallback procedure. Further, the called UE returns a waiting indication message to the MME, indicating that the called UE has started a man-machine interaction program.

If the CS paging notification message sent by the MME in step 302 carries the ID of the calling UE, namely, the called UE obtains the ID of the calling UE from the MME, for example, the MSISDN of the calling UE, the called UE in this step may add the MSISDN of the calling UE to the prompt information.

Step 304: The MME receives the waiting indication message and returns a called-UE paging status message to the MSC, indicating that the called UE has received the paging notification message and has started a man-machine interaction program.

Step 305: The MSC receives the paging status message, extends time of waiting for the CS paging response from the called UE, and returns an alerting message (namely, an ACM) of CS call link setup to the calling MSC according to the preset policy so that the calling MSC forwards the alerting message to the calling UE.

Step 306: The called UE receives a CS paging notification message, and displays prompt information according to preset CS fallback configuration information, requesting the user to confirm whether to execute a CS fallback procedure.

Step 307: After receiving an execution command input by the user, namely, a command for terminating the current data service and performing the voice service, the called UE records a user selection, and sends a service request message to the eNB.

Step 308: The eNB receives the service request message and forwards it to the MME.

Step 309: The MME receives the service request message, and initiates a CS fallback procedure.

Till this step, the called UE falls back to the CS domain, sets up a CS call link for answering the call, and hands over the current PS bearer to the UTRAN and suspends it.

In step 303 in this embodiment, the CS fallback configuration information may be "always answer the call first", and therefore, after receiving the CS paging notification message, the called UE decides not to display prompt information, but to confirm execution of a CS fallback procedure directly. Alternatively, the CS fallback configuration information may be "always request the user to confirm", and therefore, after receiving the CS paging notification message, the called UE decides to display prompt information that instructs the user to confirm whether to execute a CS fallback procedure. The CS fallback configuration information may be "request the user to confirm when the UE performs a packet service that permits no interruption (such as online video or game)", and therefore, when the called UE receives the CS paging notification message in the process of a non-interruptible packet service, the called UE decides to display prompt information that instructs the user to confirm whether to execute a CS fallback procedure. Alternatively, the CS fallback configuration information may be "always answer the call with priority for the calling UEs on a specific white list; or always reject calls for the calling UEs on a specific blacklist; or request the user to confirm for the calling UEs on neither the white list nor the blacklist", and therefore, after the called UE receives the CS paging notification message triggered by the calling UE on the specific white list, the called UE decides not to display the prompt information, but to confirm execution of a CS fallback procedure directly; after the called UE receives the CS paging notification message triggered by the calling UE on the specific blacklist, the called UE decides not to display the prompt information, but to reject the CS fallback procedure directly; after the called UE receives the CS paging notification message triggered by other calling UEs, the called UE decides to display the prompt information that instructs the user to confirm whether to execute the CS fallback procedure. When the called UE decides to display the prompt information, the called UE returns a waiting indication message to the MME, so as to notify the MME that the called UE has started a man-machine interaction program, and it may take a long time to respond to the paging request of the MSC no matter whether the user of the called UE decides to execute the CS fallback procedure or reject the CS fallback procedure. If the called UE believes no need of displaying the prompt information, the called UE confirms execution of the CS fallback procedure or rejects the CS fallback procedure directly, and the called UE in this step does not need to return a waiting indication message to the MME, but starts a CS fallback procedure directly. Before receiving the waiting indication message from the UE, the MME does not return the called-UE paging status message to the MSC.

Nevertheless, the technical solution under the present invention does not exclude this possibility: The called UE still sends a waiting indication message to the MME even if deciding not to display the prompt information after receiving the CS paging request message from the MME.

Similarly to the second embodiment, step 304 in this embodiment may be performed in two modes: The MME returns the called-UE paging status message to the MSC immediately after receiving the waiting indication message; or, after receiving the waiting indication message, the MME starts a timer, and returns the called-UE paging status message to the MSC after expiry of the timer.

This embodiment differs from the second embodiment in that: The MME in this embodiment negotiates with the called UE before returning the UE paging status message to the MSC. That is, according to the waiting indication message received from the called UE, if the MME determines that the called UE has started a man-machine interaction program that instructs the user to confirm whether to execute the CS fallback procedure, the MME returns the called-UE paging status message to the MSC, indicating the paging status information of the called UE. If the MME determines that the called UE starts no man-machine interaction program that instructs the user to confirm whether to execute the CS fallback procedure, the MSC waits for the paging response as usual according to a normal procedure, without extending the time of waiting for the paging response; or the MSC sends the alerting message to the calling party beforehand.

As mentioned in the third embodiment of the present invention, after the UE currently connected on the E-UTRAN receives the CS paging notification message from the MME, the UE may decide whether to display the prompt information that instructs the user to confirm whether to execute the CS fallback procedure, depending on the configuration specified in the message and the packet service status. However, the user experience is affected. If the user of the UE confirms execution of the CS fallback procedure, the user believes that the call has been answered according to the experience in the existing CS calls. However, in some CS supplementary services such as the call forwarding service and call deflection service, it is not appropriate for the user of the called UE to judge whether to answer the call according to the telephone number of the called UE alone.

In the call forwarding service, when user A of the calling UE originates a call to user B, the service data of user B (forwarding party) is set to "forward the call to user C", and therefore, the UE of user C displays the prompt information that is the calling party information, namely, the telephone number of user A. However, it is possible that user C is willing to answer the call of user A, but is not willing to hear any call forwarded by user B. If it is necessary to confirm direct answering of the call when the called user C is requested to confirm the CS fallback, the called user is deprived of the right of choosing to answer the call according to the forwarding-party information in the call forwarding service. In the call deflection service, when user A of the calling UE originates a call to user B, after the UE rings, user B inputs the MSISDN of user C on the UE to forward the call to user C. The call deflection service differs from the call forwarding service in that: In the call deflection service, the intermediate user B needs to input the telephone number of the user C before choosing to "accept" the conversation, and confirm execution of call deflection; in the call deflection service, the call from user A to user B is an ordinary call, and therefore, the MSC is unable to determine whether user B will initiate call deflection or not before user B performs operations. The call deflection operation involves interactions between the UE and the MSC. If the prompt information gives only two operation options (namely, "answer" or "reject" the voice call) when requesting the user of the called UE to confirm the CS fallback procedure, and gives no option of the call deflection operation, the CS fallback solution deprives the user of the right of using the call deflection service.

Figure 4:
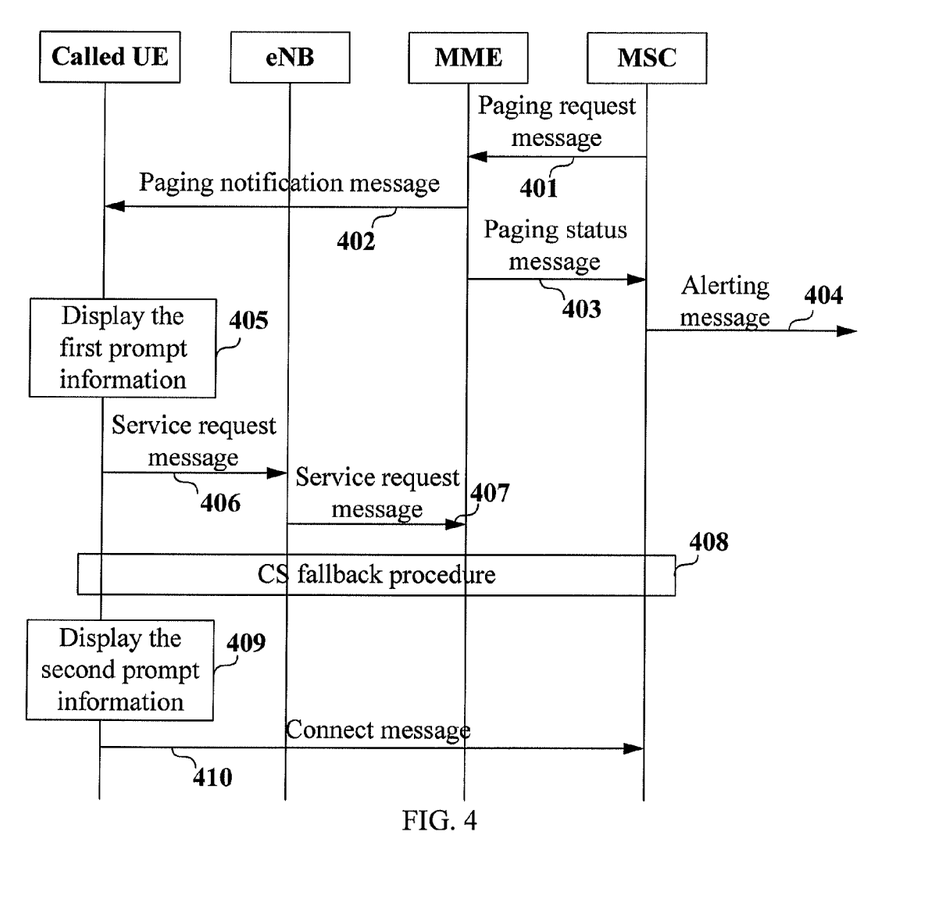
FIG. 4 is a flowchart of a paging processing method provided in a fourth embodiment of the present invention.

FIG. 4 is a flowchart of a paging processing method provided in the fourth embodiment of the present invention. In this embodiment, the called UE accesses the EPC currently through an E-UTRAN, and the called MIME is associated with the terminating MSC through an SGs interface. As shown in FIG. 4, the method in this embodiment includes the following steps:

Step 401: The terminating MSC receives an IAM from the calling party, where the IAM carries an MSISDN of the called UE. The MSC searches the context of the called UE according to the called UE MSISDN carried in the IAM, and obtains an IMSI corresponding to the called UE. The MSC sends a paging request message to the called MME, where the paging request message carries the IMSI of the called UE and the service type ID.

The service type ID may represent an ordinary voice call, or any type of supplementary services such as the call forwarding service. As mentioned above, whether the called user initiates the call deflection service completely depends on the operation of the called user. Before this, the MSC processes the call as an ordinary call. Therefore, the service type ID does not represent a call deflection service. In the subsequent procedure, according to the service type represented by the service type ID and the configuration information on the called UE, the called UE may determine whether the prompt information needs to be displayed for this service type again after the called UE falls back to the CS domain. The prompt information instructs the user of the called UE to confirm whether to answer the call.

This service type ID may be an ID indicating whether to display prompt information again. That is, after the MSC judges the service type, the MSC indicates whether it is necessary to display the prompt information again after the called UE falls back to the CS domain. The prompt information instructs the user of the called UE to confirm whether to answer the call. For example, for an ordinary voice call, the MSC generates an ID indicating no need of displaying prompt information again; for a call forwarding service, the MSC generates an ID indicating the need of displaying prompt information again.

The IAM may further carry the ID of the calling UE, for example, the MSISDN of the calling UE. In this case, the paging request message carries the ID of the calling UE accordingly.

Step 402: The MME receives the paging request message, searches the context of the called UE according to the called UE IMSI carried in the paging request message, and sends a CS paging notification message to the called UE through a NAS message when the MME determines that the called UE is connected according to the status recorded in the context of the called UE.

If the paging request message sent by the MSC in step 401 carries the call-related information such as the ID of the calling UE and service type ID, namely, the MME obtains the call-related information such as the ID of the calling UE and service type ID from the MSC, the MME in this step may add the related information to the CS paging notification message.

Step 403: The MME returns a called-UE paging status message to the MSC, indicating that the called UE has received the paging notification message and has started a man-machine interaction program.

The MME may return a paging status message of the called UE to the MSC immediately; or negotiate with the called UE and then return a paging status message of the called UE to the MSC according to a waiting indication message returned by the called UE, which are respectively described in the second embodiment and the third embodiment above.

Step 404: The MSC receives the paging status message, extends time of waiting for the CS paging response from the called UE, and returns an alerting message (namely, an ACM) of CS call link setup to the calling party according to the preset policy.

Step 405: The called UE receives a CS paging notification message, and displays the first prompt information according to the preset CS fallback configuration information and the service type ID carried in the CS paging notification message. The first prompt information instructs the user to confirm whether to execute a CS fallback procedure. Further, the called UE determines the content of the first prompt information according to the service type ID. For example:

When the service type in the CS paging notification message indicates no need of further confirmation, the first prompt information displayed by the called UE includes no content of requiring further confirmation before answering the call. That is, the prompt information is to request the user to confirm whether to answer the call directly. For example, the prompt information includes "You have a call from 13XXXXXXXXX. Do you want to interrupt the current XXXX packet service and answer this call directly?", and provides operation options such as "accept", "reject" and "call deflection" for the user.

When the service type in the CS paging notification message indicates the need of further confirmation, the first prompt information displayed by the called UE includes the content of requiring further confirmation before answering the call. That is, the prompt information is to request the user to confirm whether to interrupt the current packet service and fall back to the CS domain, but not to confirm answering of the call directly. Instead, the user confirms whether to answer the call after fallback to the CS domain. For example, the prompt information includes "You have a call from 13XXXXXXXXX, and this call is a call forwarding service that may require you to confirm whether to answer the call after receiving the call information. Do you want to interrupt the current XXXX packet service and receive the call information?", and provides operation options such as "accept" and "reject" for the user.

Step 406: The called UE obtains the first instruction, where the first instruction is input by the user according to the first prompt information, records a user selection, and sends a service request message to the eNB according to the first instruction.

Step 407: The eNB receives the service request message and forwards it to the MME.

Step 408: The MME receives the service request message, and initiates a CS fallback procedure.

Till this step, the called UE falls back to the CS domain and a CS call link is set up.

Step 409: The called UE displays the second prompt information according to the service type ID and the first instruction.

Step 410: The called UE obtains the second instruction, where the first instruction is input by the user according to the second prompt information, and returns a Connect message to the MSC according to the second instruction.

In this embodiment, if the service type ID represents a supplementary service that instructs the user to reconfirm whether to answer the call after fallback to the CS domain, or if the service type ID represents an ordinary service but the first instruction, where the first instruction is input by the user of the called UE according to the first prompt information indicates the need of reconfirmation; and, if the user selects the "call deflection" option, after the CS call link is set up, the called UE may further display the second prompt information that instructs the user to reconfirm. If the user does not select the "call deflection" option, it is not necessary to display the second prompt information that instructs the user to reconfirm. In this case, the called UE may return a response indicative of accepting the call signaling (Connect) to the MSC immediately after the CS call link is set up, and the called user may start the conversation directly.

In this embodiment, a delay of a few seconds occurs in the PS handover, the procedure for responding to the paging request in the CS domain, and the procedure for setting up a CS call link during the CS fallback. In this period, the CS call link between the user of the called UE and the user of the calling UE is not connected, and the conversation is still disabled between both parties. That is, the called user is unable to hear the voice of the calling party, and the calling party is unable to hear the voice of the called user. In the existing CS voice service in the prior art, after the called user presses the "accept" key, because the CS paging link has been set up, the conversation can start immediately. To prevent the called user from mistakenly believing a failure to answer the call due to a failure to hear the voice of the calling party when waiting for the CS fallback, the called UE may play sound information in the process of executing the CS fallback procedure. The sound information may be a special sound effect, indicating to the user of the called UE that the call is being processed and that the user does not need to reattempt the call before completion of this sound effect. To give a clearer prompt to the user of the called UE, the called UE may play different sound information for the call that requires no reconfirmation and the call that requires reconfirmation respectively.

The paging request message sent by the MSC to the MME should be as simple as practicable, and generally carry the general call information such as the ID of the called UE and the ID of the calling UE. However, the CS supplementary services involve a lot of special call-related information, for example, the forwarding-party ID in the call forwarding service. However, after fallback to the CS domain, the called UE obtains complete call-related service information in the CS domain from the MSC in the process of setting up the call link. The displayed second prompt information may include richer information content, and the user of the called UE can judge whether to answer the call more accurately.

For example, for the call forwarding service, the user of the called UE judges whether to answer the paging according to the displayed forwarding-party number; after fallback to the CS domain, the called UE interacts with the MSC directly according to the existing CS call procedure, and the prompt information provides operation options in addition to "accept" or "reject" for the user of the called UE, thus keeping consistent with the existing CS service processing logics and providing the same service capabilities; in the call deflection service, the user of the called UE may select a new number and forward the call to this new number.

In this embodiment, the service type ID of the MSC determines the content and operation options in the first prompt information displayed on the E-UTRAN; and the service type ID of the MSC and the operation option selected by the user according to the first prompt information determine whether to display the second prompt information after the called UE falls back to the CS domain, where the second prompt information instructs the user to reconfirm. In this way, through the CS fallback solution, the user experience is consistent with the experience in the existing CS service as far as possible, and the CS supplementary service operation options available to the user of the called UE are the same as the operation options in the existing CS service.

Figure 5:
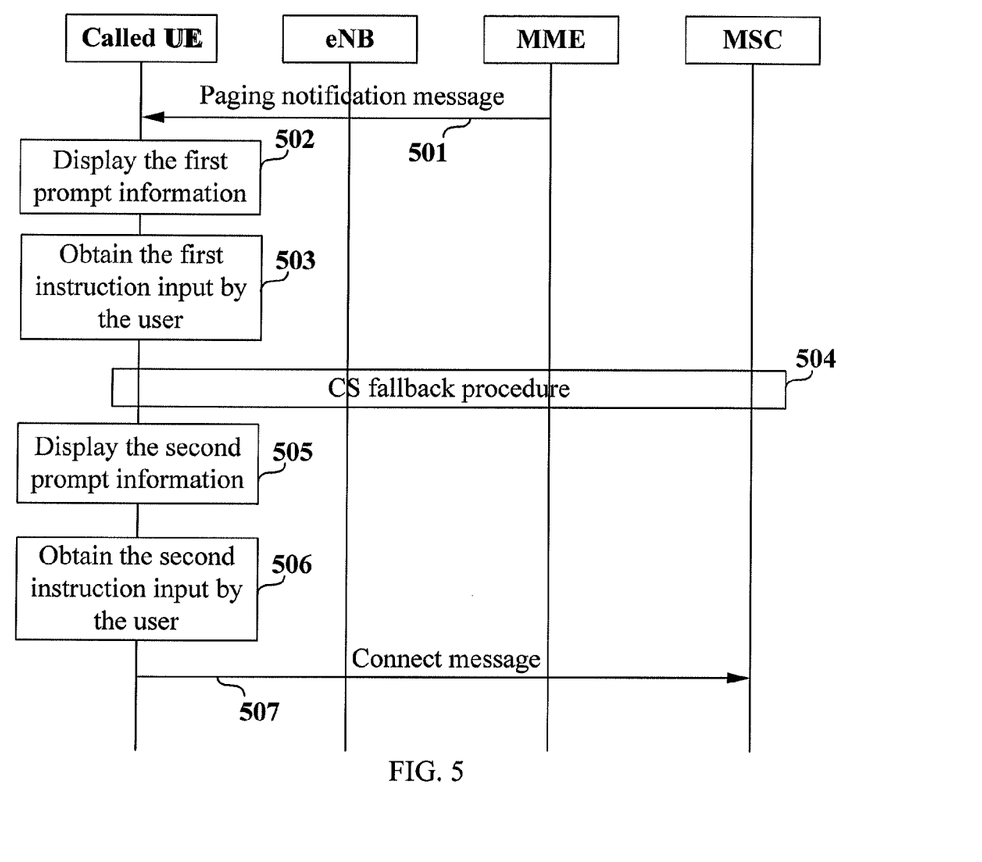
FIG. 5 is a flowchart of an information displaying method provided in a fifth embodiment of the present invention.

FIG. 5 is a flowchart of an information displaying method provided in the fifth embodiment of the present invention. In this embodiment, the called UE accesses the EPC currently through an E-UTRAN, and the called MME is associated with the terminating MSC through an SGs interface. As shown in FIG. 5, the method in this embodiment includes the following steps:

Step 501: The called UE receives a paging notification message that carries a service type ID.

The service type ID may represent an ordinary voice call, or any type of the supplementary services such as a call forwarding service. As mentioned above, whether the called user initiates the call deflection service completely depends on the operation of the called user. Before this, the MSC processes the call as an ordinary call. Therefore, the service type ID does not represent a call deflection service. In the subsequent procedure, according to the service type represented by the service type ID and the configuration information on the called UE, the called UE may determine whether the prompt information needs to be displayed for this service type again after the called UE falls back to the CS domain. The prompt information instructs the user of the called UE to confirm whether to answer the call.

This service type ID may be an ID indicating whether to display prompt information again. That is, after the MSC judges the service type, the MSC indicates whether it is necessary to display the prompt information again after the called UE falls back to the CS domain. The prompt information instructs the user of the called UE to confirm whether to answer the call. For example, for an ordinary voice call, the MSC generates an ID indicating no need of displaying prompt information again; for a call forwarding service, the MSC generates an ID indicating the need of displaying prompt information again.

Step 502: The called UE displays the first prompt information according to the preset CS fallback configuration information and the service type ID carried in the CS paging notification message. The first prompt information instructs the user to confirm whether to execute a CS fallback procedure. Further, the called UE determines the content of the first prompt information according to the service type ID. For example:

When the service type in the CS paging notification message indicates no need of further confirmation, the first prompt information displayed by the called UE includes no content of requiring further confirmation before answering the call. That is, the prompt information is to request the user to confirm whether to answer the call directly. For example, the prompt information includes "You have a call from 13XXXXXXXXX. Do you want to interrupt the current XXXX packet service and answer this call?", and provides operation options such as "accept", "reject" and "call deflection" for the user.

When the service type in the CS paging notification message indicates the need of further confirmation, the first prompt information displayed by the called UE includes the content of requiring further confirmation before answering the call. That is, the prompt information is to request the user to confirm whether to interrupt the current packet service and fall back to the CS domain, but not to confirm answering of the call directly. Instead, the user confirms whether to answer the call after fallback to the CS domain. For example, the prompt information includes "You have a call from 13XXXXXXXXX, and this call is a call forwarding service that may require you to confirm whether to answer the call after receiving the call information. Do you want to interrupt the current XXXX packet service and receive the call information?", and provides operation options such as "accept" and "reject" for the user.

Step 503: The called UE obtains a first instruction, where the first instruction is input by the user according to the first prompt information.

Step 504: The called UE triggers execution of the CS fallback procedure according to the first instruction.

Step 505: The called UE displays the second prompt information according to the service type ID and the first instruction, where the second prompt information instructs the user to confirm whether to put through a call.

Step 506: The called UE obtains a second instruction, where the first instruction is input by the user according to the second prompt information.

Step 507: The called UE returns a Connect message to the MSC to put through the call according to the second instruction, or executes an operation procedure corresponding to the service type ID.

In this embodiment, if the service type ID represents a supplementary service that instructs the user to reconfirm whether to answer the call after fallback to the CS domain, or if the service type ID represents an ordinary service but the first instruction, where the first instruction is input by the user of the called UE according to the first prompt information indicates the need of reconfirmation; and, if the user selects the "call deflection" option, after the CS call link is set up, the called UE may further display the second prompt information that instructs the user to reconfirm. If the user does not select the "call deflection" option, it is not necessary to display the second prompt information that instructs the user to reconfirm. In this case, the called UE may return a response indicative of accepting the call signaling (Connect) to the MSC immediately after the CS call link is set up, and the called user may start the conversation directly.

In this embodiment, a delay of a few seconds occurs in the PS handover, the procedure for responding to the paging request in the CS domain, and the procedure for setting up a CS call link during the CS fallback. In this period, the CS call link between the user of the called UE and the user of the calling UE is not connected, and the conversation is still disabled between both parties. That is, the called user is unable to hear the voice of the calling party, and the calling party is unable to hear the voice of the called user. In the existing CS voice service in the prior art, after the called user presses the "accept" key, because the CS paging link has been set up, the conversation can start immediately. To prevent the called user from mistakenly believing a failure to answer the call due to a failure to hear the voice of the calling party when waiting for the CS fallback, the called UE may play sound information in the process of executing the CS fallback procedure. The sound information may be a special sound effect, indicating to the user of the called UE that the call is being processed and that the user does not need to reattempt the call before completion of this sound effect. To give a clearer prompt to the user of the called UE, the called UE may play different sound information for the call that requires no reconfirmation and the call that requires reconfirmation respectively.

In this embodiment, the paging notification message received by the called UE is triggered by the paging request message sent by the MSC to the MME. The paging request message sent by the MSC to the MME should be as simple as practicable, and generally carry only the general call information such as the ID of the called UE and the ID of the calling UE. However, the CS supplementary services involve a lot of special call-related information, for example, the forwarding-party ID in the call forwarding service. However, after fallback to the CS domain, the called UE obtains complete call-related service information in the CS domain from the MSC in the process of setting up the call link. The displayed second prompt information may include richer information content, and the user of the called UE can judge whether to answer the call more accurately.

For example, for the call forwarding service, the user of the called UE judges whether to answer the paging according to the displayed forwarding-party number; after fallback to the CS domain, the called UE interacts with the MSC directly according to the existing CS call procedure, and the prompt information provides operation options in addition to "accept" or "reject" for the user of the called UE, thus keeping consistent with the existing CS service processing logics and providing the same service capabilities; in the call deflection service, the user of the called UE may select a new number and forward the call to this new number.

In this embodiment, the service type ID of the MSC determines the content and operation options in the first prompt information displayed on the E-UTRAN; and the service type ID of the MSC and the operation option selected by the user according to the first prompt information determine whether to display the second prompt information after the called UE falls back to the CS domain, where the second prompt information instructs the user to reconfirm. In this way, through the CS fallback solution, the user experience is consistent with the experience in the existing CS service as far as possible, and the CS supplementary service operation options available to the user of the called UE are the same as the operation options in the existing CS service.

Figure 6:
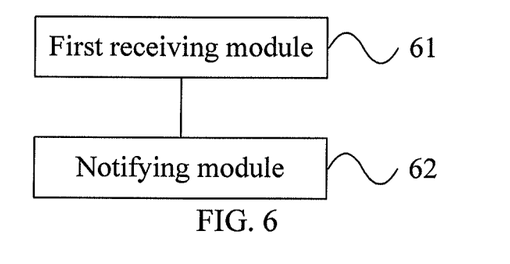
FIG. 6 shows a structure of a mobility management apparatus provided in a sixth embodiment of the present invention.

FIG. 6 shows a structure of a mobility management apparatus provided in the sixth embodiment of the present invention. As shown in FIG. 6, the mobility management apparatus in this embodiment includes a first receiving module 61 and a notifying module 62, which are connected to each other. The first receiving module 61 receives a paging request message sent by an MSC server which the called UE registers to, namely, the terminating MSC, where the paging request message may carry the ID of the called UE (such as the IMSI of the called UE). When the called UE is connected, the notifying module 62 sends a paging notification message to the called UE according to the paging request message received by the first receiving module 61, and returns a called-UE paging status message to the MSC server, indicating that the called UE has received the paging notification message.

The mobility management apparatus provided in this embodiment may be an MME in the EPS. After the first receiving module of the MME receives the paging request message from the terminating MSC, if the notifying module finds that the called UE is connected, the notifying module not only sends a CS paging notification message to the called UE, but also returns a paging status message to the MSC, indicating that the called UE has received the paging notification message. The paging status message may be sent at the time of sending the CS paging notification message, or sent after a time limit of waiting if no message indicative of accepting or rejecting the CS fallback procedure is received from the called UE within the time limit of waiting. In this way, the following case can be prevented and therefore the call success ratio is improved: The MSC performs an incorrect operation as a result of mistakenly believing that paging the called UE on the E-UTRAN fails when the called UE waits for the user to confirm execution of the CS fallback procedure.

Figure 7:
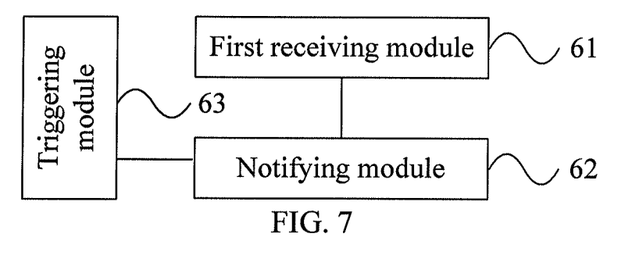
FIG. 7 shows a structure of a mobility management apparatus provided in a seventh embodiment of the present invention.

FIG. 7 shows a structure of a mobility management apparatus provided in the seventh embodiment of the present invention. As shown in FIG. 7, the mobility management apparatus in this embodiment may further include: a triggering module 63, connected to the notifying module 62, and configured to obtain the waiting indication message from the called UE and trigger the notifying module 62 to return a called-UE paging status message to the MSC server.

The difference from the previous embodiment is: The notifying module in this embodiment negotiates with the called UE before returning the UE paging status message to the MSC. That is, depending on the waiting indication message received from the called UE, if the triggering module determines that the called UE has started a man-machine interaction program that instructs the user to confirm whether to execute the CS fallback procedure, the triggering module triggers the notifying module to return the called-UE paging status message to the MSC, indicating the paging status information of the called UE. If the triggering module determines that the called UE starts no man-machine interaction program that instructs the user to confirm whether to execute the CS fallback procedure, the triggering module does not trigger the notifying module to return the called-UE paging status message to the MSC, and the MSC waits for the paging response as usual according to a normal procedure, without extending the time of waiting for the paging response; or the MSC performs the step of sending the alerting message to the calling party beforehand.

Figure 8:
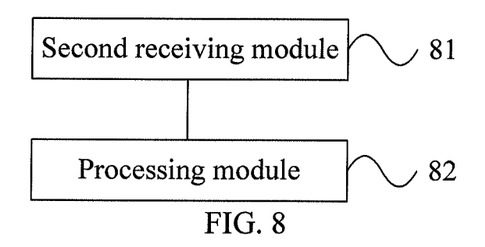
FIG. 8 shows a structure of an MSC server provided in an eighth embodiment of the present invention.

FIG. 8 shows a structure of an MSC server provided in the eighth embodiment of the present invention. As shown in FIG. 8, the MSC server in this embodiment may include: a second receiving module 81, configured to receive a called-UE paging status message returned by a mobility management apparatus; and a processing module 82, configured to extend time of waiting for a called UE to return a paging response message according to the paging status message received by the second receiving module 81, The MSC server provided in this embodiment may be an MSC in the CS domain. The MSC receives the paging status message from the MME, and knows that the called UE has received the paging notification message. In this way, the following case can be prevented and therefore the call success ratio is improved: The MSC performs an incorrect operation as a result of mistakenly believing that paging the called UE on the E-UTRAN fails when the called UE waits for the user to confirm execution of the CS fallback procedure.

Further, the processing module 82 may return an alerting message of the CS call link setup to the MSC server which the calling UE registers to according to a policy. In this way, while the called UE waits for the user to confirm execution of the CS fallback procedure, the user of the calling UE never terminates the call as a result of mistakenly believing no response from the called user.

Figure 9:
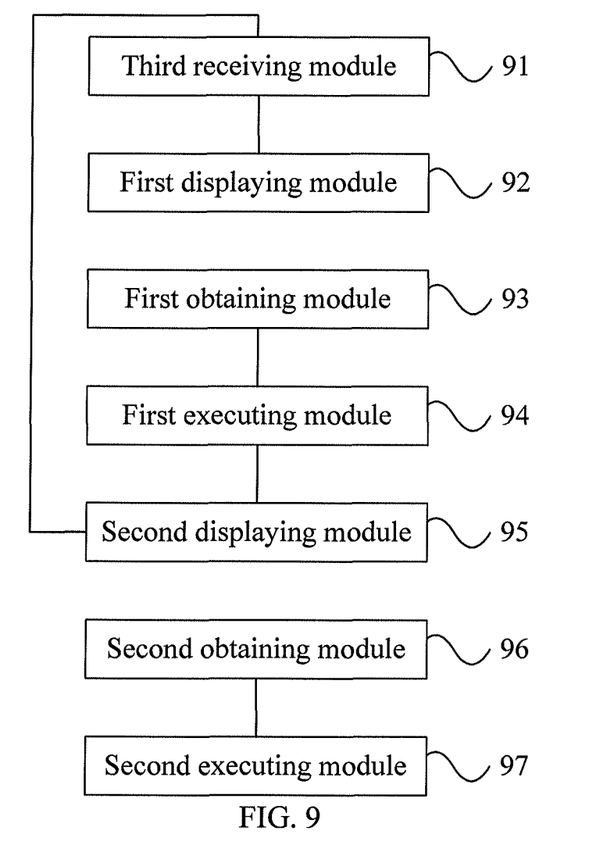
FIG. 9 shows a structure of a UE provided in a ninth embodiment of the present invention.

FIG. 9 shows a structure of a UE provided in the ninth embodiment of the present invention. As shown in FIG. 9, the UE in this embodiment may include: a third receiving module 91, configured to receive a paging notification message that carries a service type ID; a first displaying module 92, configured to display first prompt information after the third receiving module 91 receives the paging notification message, where the first prompt information instructs a user to confirm whether to accept a CS fallback procedure; a first obtaining module 93, configured to obtain a first instruction, where the first instruction is input by the user according to the first prompt information; a first executing module 94, configured to trigger execution of the CS fallback procedure according to the first instruction; a second displaying module 95, configured to display second prompt information according to the service type ID and the first instruction, where the second prompt information instructs the user to confirm whether to put through a call; a second obtaining module 96, configured to obtain a second instruction, where the first instruction is input by the user according to the second prompt information; and a second executing module 97, configured to return a Connect message to the MSC server to put through the call according to the second instruction, or execute an operation procedure corresponding to the service type ID.

In this embodiment, the service type ID of the MSC determines the content and operation options in the first prompt information displayed on the E-UTRAN; and the service type ID of the MSC and the operation option selected by the user according to the first prompt information determine whether to display the second prompt information after the called UE falls back to the CS domain, where the second prompt information instructs the user to reconfirm. In this way, through the CS fallback solution, the user experience is consistent with the experience in the existing CS service as far as possible, and the CS supplementary service operation options available to the user of the called UE are the same as the operation options in the existing CS service.

Figure 10:
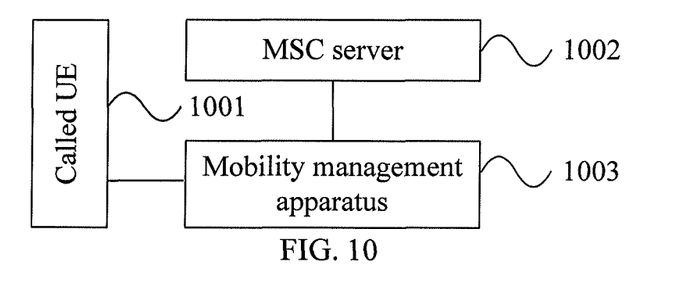
FIG. 10 shows a structure of a paging processing system provided in a tenth embodiment of the present invention.

FIG. 10 shows a structure of a paging processing system provided in the tenth embodiment of the present invention. As shown in FIG. 10, the paging processing system in this embodiment may include: a called UE 1001, registered with a mobility management apparatus 1003 and an MSC server 1002 respectively, and configured to receive a paging notification message from the mobility management apparatus 1003; the MSC server 1002, configured to send a paging request message to the mobility management apparatus 1003, where the paging request message may carry the ID of the called UE (such as the IMSI of the called UE), receive the called-UE paging status message from the mobility management apparatus 1003, and extend the time of waiting for the called UE to return the paging response message according to the paging status message; and the mobility management apparatus 1003, configured to receive the paging request message sent by the MSC server 1002, send a paging notification message to the called UE 1001 according to the paging request message when the called UE is connected, and return the paging status message of the called UE 1001 to the MSC server 1002 to indicate that the called UE 1001 has received the paging notification message.

In this embodiment, the MSC server 1002 may be an MSC in the CS domain, and may be the MSC server provided in the eighth embodiment of the present invention; the mobility management apparatus 1003 may be an MME in the EPS, and may be a mobility management apparatus provided in the sixth or seventh embodiment of the present invention; the called UE 1001 may be the UE provided in the ninth embodiment of the present invention. In this embodiment, after the MME receives the paging request message from the terminating MSC, if the MME finds that the called UE is connected, the MME not only sends a CS paging notification message to the called UE, but also returns a paging status message to the MSC, indicating that the called UE has received the paging notification message. The paging status message may be sent at the time of sending the CS paging notification message, or sent after a time limit of waiting if no message indicative of accepting or rejecting the CS fallback procedure is received from the called UE within the time limit of waiting. In this way, the following case can be prevented and therefore the call success ratio is improved: The MSC performs an incorrect operation as a result of mistakenly believing that paging the called UE on the E-UTRAN fails when the called UE waits for the user to confirm execution of the CS fallback procedure.

Further, the called UE in this embodiment may be further configured to display the first prompt information after receiving the CS paging notification message. The first prompt information instructs the user to confirm whether to execute a CS fallback procedure. The called UE determines the first prompt information (content and operation options) according to the service type ID, obtains the first instruction, where the first instruction is input by the user of the called UE according to the first prompt information, and triggers the mobility management apparatus to execute the CS fallback procedure according to the first instruction.

The CS paging notification message received by the called UE may further carry a service type ID. Further, the called UE may be configured to display the second prompt information according to the service type ID and the first instruction, obtain the second instruction, where the first instruction is input by the user of the called UE according to the second prompt information, and return a Connect message to the MSC server according to the second instruction to put through the call, or execute the operation procedure corresponding to the service represented by the service type ID. In this embodiment, if the service type ID represents a supplementary service that instructs the user to reconfirm whether to answer the call after fallback to the CS domain, or if the service type ID represents an ordinary service but the first instruction, where the first instruction is input by the user of the called UE according to the first prompt information indicates the need of reconfirmation; and, if the user selects the "call deflection" option, after the CS call link is set up, the called UE may further display the second prompt information that instructs the user to reconfirm. If the user does not select the "call deflection" option, it is not necessary to display the second prompt information that instructs the user to reconfirm. In this case, the called UE may return a Connect message indicative of accepting the call signaling to the MSC server immediately after the CS call link is set up (namely, put through the call directly), and the user of the called UE may start the conversation directly.

In this embodiment, the service type ID of the MSC determines the content and operation options in the first prompt information displayed on the E-UTRAN; and the service type ID of the MSC and the operation option selected by the user according to the first prompt information determine whether to display the second prompt information after the called UE falls back to the CS domain, where the second prompt information instructs the user to reconfirm. In this way, through the CS fallback solution, the user experience is consistent with the experience in the existing CS service as far as possible, and the CS supplementary service operation options available to the user of the called UE are the same as the operation options in the existing CS service.

The PS domain and the CS domain in the embodiments above may be a combination of various PS systems and CS systems in the prior art. For example, the PS domain may be the PS domain of the GPRS, UMTS, EPS, WiMAX, and CDMA HRPD; and the CS domain may be the CS domain of the GSM (GERAN), WCDMA (UTRAN), and CDMA 1× RTT.

Persons of ordinary skill in the art should understand that all or part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a Read-Only Memory (ROM), a Random Access Memory (RAM), a magnetic disk, or a CD-ROM.

Finally, it should be noted that the above embodiments are merely provided for describing the technical solution of the present invention, but not intended to limit the present invention. It is apparent that persons skilled in the art can make various modifications and variations to the invention without departing from the spirit and scope of the invention. The present invention is intended to cover the modifications and variations provided that they fall within the scope of protection defined by the following claims or their equivalents.

What is claimed is:

1. A paging processing method, comprising:
receiving, by a Mobility Management Entity (MME), a paging request message sent by a Mobile Switching Center (MSC) server for a called User Equipment (UE) registered to the MSC server;
sending, by the MME, a paging notification message to the called UE when the called UE is connected to the MME;
indicating, by the MME, a status of communication between the called UE and the MME to the MSC server before the MME receives a service request from the called UE; and
receiving, by the MME, the service request message from the called UE.

2. The method according to claim 1, further comprising:
extending, by the MSC server, time of waiting for the called UE to return a paging response message after the MSC server receives the status of communication between the called UE and the MME.

3. A mobility management apparatus, comprising:
a receiver, configured to receive a paging request message sent by a Mobile Switching Center (MSC) server for a called User Equipment (UE) registered to the MSC server, and to receive a service request message from the called UE; and
a transmitter, configured to send a paging notification message to the called UE when the called UE is connected to the MME, and indicate a status of communication between the called UE and the mobility management apparatus to the MSC server before receiving the service request from the called UE.

4. A paging processing system, comprising:
a Mobile Switching Center (MSC) server for a called User Equipment (UE) registered to the MSC server, configured to send a paging request message to a mobility management apparatus, to receive a status of communication between the called UE and the mobility management apparatus by the mobility management apparatus; and the mobility management apparatus, configured to receive the paging request message sent by the MSC server, to send a paging notification message to the called UE when the called UE is connected to the mobility management apparatus, to indicate the status of communication between the called UE and the mobility management apparatus to the MSC before receiving a service request from the called UE, and to receive the service request message from the called UE.

5. The method according to claim 1, wherein after the receiving a service request message from the called UE, the method further comprises:

initiating, by the MME, a CS fallback procedure.

6. The method according to claim 1, wherein sending the paging notification message to the called UE comprises sending, by the MME, a CS paging notification message to the called UE through a Non Access Stratum (NAS) message.

7. The method according to claim 1 wherein the indicating includes returning, by the MME to the MSC server, a called UE paging status message.

8. The apparatus according to claim 3, wherein the transmitter is further configured to initiate a CS fallback procedure after the receiver receives the service request message from the called UE.

9. The system according to claim 4, wherein the MSC is further configured to return an alerting message to a calling party immediately after receiving the status of communication between the called UE and the mobility management apparatus.

10. The system according to claim 4, wherein the mobility management apparatus is further configured to initiate a CS fallback procedure after receiving the service request message from the called UE.

* * * * *

UNITED STATES PATENT AND TRADEMARK OFFICE
CERTIFICATE OF CORRECTION

| | |
|---|---|
| PATENT NO. | : 9,049,677 B2 |
| APPLICATION NO. | : 13/101816 |
| DATED | : June 2, 2015 |
| INVENTOR(S) | : Yu Yin et al. |

It is certified that error appears in the above-identified patent and that said Letters Patent is hereby corrected as shown below:

On the Title Page, item 75 Inventors, line 2, delete "Shanghai (CH)" and insert --Shanghai (CN)--.

Signed and Sealed this
Third Day of May, 2016

Michelle K. Lee
*Director of the United States Patent and Trademark Office*